United States Patent [19]
Dreher

[11] Patent Number: 6,106,038
[45] Date of Patent: Aug. 22, 2000

[54] SYSTEM FOR COLLISION DAMAGE REDUCTION

[76] Inventor: Peter A. Dreher, P.O. Box 39, New Carlisle, Ohio 45344

[21] Appl. No.: 08/923,611

[22] Filed: Sep. 4, 1997

Related U.S. Application Data

[60] Provisional application No. 60/025,655, Sep. 7, 1996.

[51] Int. Cl.[7] .................................................. B60R 19/38
[52] U.S. Cl. ........................... 293/118; 293/119; 293/107
[58] Field of Search .................................. 293/118, 107, 293/110, 119, 2, 1; 180/275, 277

[56] References Cited

U.S. PATENT DOCUMENTS

| | | | |
|---|---|---|---|
| 1,925,763 | 9/1933 | Kirschen | 180/277 |
| 2,834,606 | 5/1958 | Bertrand | 280/730.1 |
| 3,565,791 | 2/1971 | Truesdell | 293/1 |
| 3,588,142 | 6/1971 | Gorman | 280/150 |
| 3,656,790 | 4/1972 | Truesdell | 293/1 |
| 3,708,194 | 1/1973 | Amit | 293/1 |
| 3,822,076 | 7/1974 | Mercier | 293/1 |
| 3,823,969 | 7/1974 | Sapper | 293/71 |
| 3,961,818 | 6/1976 | Roth | 293/107 |
| 4,441,751 | 4/1984 | Wesley | 296/1 S |
| 4,869,538 | 9/1989 | Presley | 293/107 |
| 4,934,477 | 6/1990 | Dai | 180/277 X |
| 5,042,859 | 8/1991 | Zhang | 293/107 |
| 5,106,137 | 4/1992 | Curtis | 293/107 |
| 5,314,037 | 5/1994 | Shaw et al. | 180/169 |
| 5,357,438 | 10/1994 | Davidian | 364/461 |
| 5,461,357 | 10/1995 | Yoshioka et al. | 340/435 |
| 5,646,613 | 7/1997 | Cho | 340/903 |

FOREIGN PATENT DOCUMENTS

| | | | |
|---|---|---|---|
| 0168746 | 7/1987 | Japan | 293/107 |
| 0155854 | 6/1990 | Japan | 293/107 |
| 4060722284 | 3/1994 | Japan | 280/730 R |
| 6-239198 | 8/1994 | Japan | 280/730 R |

OTHER PUBLICATIONS

Blink of an Eye May 1993 Don Sherman p. 81 3 pages Motor Trend v45n5.

*Primary Examiner*—Joseph D. Pape
*Attorney, Agent, or Firm*—Biebel & French; Mark Rose; Gil Henderson

[57] ABSTRACT

A collision damage reduction system to reduce contact velocities between a vehicle and a collidant by use of air bags on the exterior of the vehicle. The vehicle operator or an automatic collision imminence detection system e.g. radar, sonar, or an accelerometer and controller actuates a switch that actuates the air bag inflators when a collision is perceived imminent. The switch or controller can also interrupt vehicle motive power and actuate the brakes. The air bag has vents and shapes to steer it and its collidants. The controller can also actuate vehicle horns and lights to warn collidants when imminent collisions are detected.

20 Claims, 5 Drawing Sheets

SYSTEM FOR COLLISION DAMAGE REDUCTION

CROSS-REFERENCE TO RELATED APPLICATIONS

I claim benefit of Provisional Patent Application Ser. No. 60/025,655, filed Sep. 7, 1996, for this patent application.

STATEMENT REGARDING FEDERALLY SPONSORED RESEARCH OR DEVELOPMENT

Not applicable.

REFERENCE TO "MICROFICHE APPENDIX"

Not applicable.

BACKGROUND

1. Field of Invention

This invention relates to systems on cars, trucks, buses, ambulances, and trains that reduce the collision damage on the vehicle, its occupants, and collidants.

2. Description of Prior Art

Most vehicles and structures have some exterior system to deal with collisions. Automobiles have the five mile per hour bumpers with metal hydraulic shock absorbers or polymer foams. Trucks have rigid metal bumpers that might crumple during a collision. Trains used to have cow catchers.

Disadvantages

The five mile per hour bumper is relatively useless at preventing property damage and personal injury at speeds above 5 mph. U.S. Pat. No. 4,869,538 addressed this problem by putting a rubber inner tube around the outside of the front bumper. This tube was permanently inflated. It had to be rather small to deal with the limits of parking spaces. It never became commercial because of wind drag, aesthetics, weight, expense, and the impression that one was driving a stolen car from a carnival bumper car ride. This air filled bumper did reduce collision forces and added a few miles per hour to the lower threshold for vehicle damage. The tube is much too small to keep collidants under the 18 g level that causes bodily injury, at speeds above 10 mph.

U.S. Pat. No. 3,656,791 has an inflatable exterior air bag actuated by a probe inside the air bag cover. But this bag inflates after the impact begins to damage the vehicle and the collidant. This bag reduces damage only at speeds less than 10 miles per hour. This small bag, only about 4 cubic feet, also increases the forces on the vehicle and collidant by creating more recoil after collision contact.

Trains used to have cow catchers. But today trains go so fast that they will kill anything they hit, cow catcher or not. Therefore, they have no collision damage reduction systems other than a manual brake, horn, and lights.

Trucks have heavy steel bumpers with no force reduction systems. They too kill anything they hit because of their 100,000 pound plus mass and high speeds. Their only collision damage reduction systems are manual lights, brakes, steering, and horns. A few trucks have collision warning radars and sonars, but these systems only turn on lights and beepers inside the cab to alert the driver. Some actuate brakes or throttle. These radars are very expensive with many years to payback.

Some buses have water filled bladder bumpers that reduce collision forces. These systems are too small to do more than shave 5 mph off a collision's severity. Otherwise, buses are limited to the collision damage reduction systems listed for trucks.

SUMMARY OF THE INVENTION

The present invention is a collision damage reduction system that first detects an imminent collision either by a radar or sonar or by the vehicle human operator. Then the operator or the radar or sonar actuates an electrical switch. The switch closes a circuit and puts electrical current to a heater wire in the air bag inflator. In a few milliseconds the propellant at the heater wire rises in temperature enough to ignite. The air bag inflates outside the vehicle and cushions the collision with the collidant, be it another vehicle, a stationary object, a wall, a bridge abutment, a tree, etc. The switch can also simultaneously interrupt the electrical circuit for the vehicle motive power i.e. ignition on engines and power switch on electric vehicles. The air bag switch can also simultaneously close a circuit on a solenoid to actuate a vehicle braking system.

As the air bag compresses, it tends to buckle. But because of eccentric loading on the ends of the bag and air jets on the top of the bag, it tends to buckle downward. The downward bag hinging is halted by contact with the road, thereby creating a stable buckle. As the bag compresses, the gas pressure inside rises. To prevent bag bursting and excessive accelerations on vehicle occupants, two blowout patches in the bag relieve the pressure. One is set at 30 psig. and the other at 40 psig.

Teachings

The physics of vehicle exterior air bags are such that, the vehicle begins to slow down as it begins compressing its air bags against a collidant. The area of the bag contact on the front of the vehicle times the bag pressure equal the force on the vehicle. The force on the vehicle divided by its mass equals its deceleration or rate of reduction in velocity per unit time per Newton's Law of Motion: Force=Mass×Acceleration. As the bag compresses, the vehicle moves slower and slower, taking longer and longer to compress each subsequent length of bag. The vehicle velocity drops off exponentially with each additional foot of bag compression.

But simultaneous with each foot of bag compression, the gas pressure inside the bag rises inverse proportionately to the remaining space in the bag (according to the Ideal Gas Law assuming constant gas mass and temperature.) This bag pressure also rises exponentially with each foot of bag compression creating higher forces to slow the vehicle. Therefore, an unvented air bag slows a vehicle doubly exponentially.

Unfortunately, the human in the vehicle can only stand 18 g's of deceleration before his brain squishes against his skull in a way that does permanent damage. Conventional steering wheel air bags limit accelerations on humans by venting the air bag. As soon as the vehicle hits a collidant, an accelerometer in the bumper closes a switch which ignites the steering wheel air bag to full deployment in about 15 milliseconds. The driver's body his the air bag a few milliseconds later, compressing the bag and its gases. The large vent hole or the porous fabric, vents the gases at about the rate the driver is compressing it.

Unfortunately, the vehicle exterior air bag of the present invention may be inflated anywhere from 10 milliseconds before contact with a collidant to 4,000 milliseconds or more and be required to hold the gas mass this entire time. With enough porous fabric or vent hole area to keep accelerations below 18 g's, the bag of the present invention would be limp by the time of collidant contact for all but the most immediate impacts.

Therefore, the invention uses silicone rubber coated fabric with no holes to hold the initial bag pressure and two pressure relief valves to expel gas when the compression is underway. The initial inflation pressure of the bag is 15 pounds per square inch above the ambient atmospheric pressure, so designated 15 psig., to provide good initial deceleration. The invention uses a weakly sewn piece of fabric that blows open a 0.4 square foot patch at a bag pressure of 30 psig. as a pressure relief valve of light weight and low cost. For faster collisions when the bag pressure can exceed 40 psig., a second fabric patch of 0.3 square feet tears open to further relieve pressure. As long as the bag pressure stays below 62.5 psig. on a 3,000 lb car with 6 square feet of frontal area, the car deceleration will stay below 18 g's. The sizes of the openings and the strength of the stitching may be varied as necessary to achieve the desired pressure levels within the bag. The occupant decelerations tend to be ten to twenty percent lower than the vehicle decelerations because of motion in the cab.

Table 1 and 2 show bag pressures and vehicle velocities for a 3,000 lb car hitting an immovable wall at initial velocities of 45 mph and 30 mph. The bag pressure was calculated using the Ideal Gas Law: PV=nRT, assuming a constant temperature of 200 F and a gas constant R for air (53.34 ft-lbforce/lbmass-degrees Rankine, similar to the carbon dioxide and water vapor of the bag inflation gases). The mass flow rate

TABLE 1

Five Foot Bag in 1/2 foot Steps
Collision at 45 mph (66 fps) with Minor Bag Venting on top surface & 2 Pressure Relief Valves

| Compression Step 0.5ft | Car Mass 3,000 lbs | Leak Rate lbm/sec ft2 Psig. | | 0.001 | |
|---|---|---|---|---|---|
| Time until first contact in seconds | | 0.5 | | Initial Bag Press. Psig. | 15 |
| d Length ft | 0.5 Bag Initial Air Mass lbm at 200F. | | 7.1394231 | | |
| Bag Length | Leak Area | Volume | d Time | Bag Air lbm Pressure g | Speed fps |
| 5 | 20 | 50 | 0.5 | 6.9918984 14.386297 | 66 |
| 4.5 | 18 | 47 | 0.0075758 | 6.9897187 16.233223 | 64.923677 |
| 4 | 16 | 45 | 0.0077014 | 6.9897187 17.608033 | 63.714385 |
| 3.5 | 14 | 40 | 0.0078475 | 6.9897187 21.646537 | 62.285028 |
| 3 | 12 | 35 | 0.0080276 | 6.9897187 26.838899 | 60.479037 |
| 2.5 | 10 | 30 | 0.0082673 | 6.9897187 33.762049 | 58.15436 |
| 2 | 8 | 25 | 0.0085978 | 6.4897187 39.294452 | 55.239857 |
| 1.5 | 6 | 20 | 0.0090514 | 5.903245 46.693748 | 51.628468 |
| 1 | 4 | 15 | 0.0096846 | 4.6546425 49.844376 | 47.290387 |
| 0.5 | 2 | 10 | 0.010573 | 3.221548 52.308198 | 42.278925 |
| 0 | 0 | 5 | 0.0118262 | 1.5573948 50.087623 | 36.66009 |
| Bag Mass & Pressure | 20 | 50 | 0.1 | 7.1094231 14.8752 | |
| for 0.5 seconds before | 20 | 50 | 0.1 | 7.0796727 14.751438 | |
| coilision | 20 | 50 | 0.1 | 7.0501698 14.628706 | |
| | 20 | 50 | 0.1 | 7.0209124 14.506996 | |
| | 20 | 50 | 0.1 | 6.9918984 14.386297 | |
| Pressure Relief Valve 1 Area ft2 | | | 0.4 | | |
| Pressure Relief Valve 1 Open Pressure Psig. | | | 30 | | |
| Pressure Relief Valve 2 Area ft2 | | | 0.3 | | |
| Pressure Relief Valve 2 Open Pressure Psig. | | | 40 | | |

TABLE 2

Five Foot Bag in 1/2 foot Steps
Collision at 45 mph (66 fps) with Minor Bag Venting on top surface & 2 Pressure Relief Valves

| Compression Step 0.5ft | Car Mass 3,000 lbs | Leak Rate lbm/sec ft2 Psig. | | 0.001 | |
|---|---|---|---|---|---|
| Time until first contact in seconds | | 0.5 | | Initial Bag Press. Psig. | 15 |
| d Length ft | 0.5 Bag Initial Air Mass lbm at 200F. | | 7.1394231 | | |
| Bag Length | Leak Area | Volume | d Time | Bag Air lbm Pressure g | Speed fps |
| 5 | 20 | 50 | 0.25 | 6.9918984 14.386297 | 44 |
| 4.5 | 18 | 47 | 0.0113636 | 6.9886288 16.2284 | 42.385771 |
| 4 | 16 | 45 | 0.0117964 | 6.9886288 17.602995 | 40.533997 |
| 3.5 | 14 | 40 | 0.0123353 | 6.9886288 21.64087 | 38.287839 |
| 3 | 12 | 35 | 0.013059 | 8.9886288 26.832422 | 35.350665 |
| 2.5 | 10 | 30 | 0.014144 | 6.9886288 33.754493 | 31.374456 |
| 2 | 8 | 25 | 0.0159365 | 6.0619929 35.735781 | 26.235.963 |
| 1.5 | 6 | 20 | 0.0190578 | 4.9085583 36.349006 | 19.861632 |
| 1 | 4 | 15 | 0.0251742 | 3.3664189 31.981009 | 11.880131 |
| 0.5 | 2 | 10 | 0.0420871 | 1.0088182 6.2834175 | 4.4076986 |
| 0 | 0 | 5 | 0.1134379 | −1.847559 0 | 1.1004106 |
| Bag Mass & Pressure | 20 | 50 | 0.1 | 7.1094231 14.8752 | |
| for 0.5 seconds before | 20 | 50 | 0.1 | 7.0796727 14.751438 | |
| collision | 20 | 50 | 0.1 | 7.0501698 14.628706 | |
| | 20 | 50 | 0.1 | 7.0209124 14.506996 | |
| | 20 | 50 | 0.1 | 6.9918984 14.386297 | |
| Pressure Relief Valve 1 Area ft2 | | | 0.4 | | |
| Pressure Relief Valve 1 Open Pressure Psig. | | | 30 | | |
| Pressure Relief Valve 2 Area ft2 | | | 0 | | |
| Pressure Relief Valve 2 Open Pressure Psig. | | | 40 | | | of gas through the relief openings was calculated using the Compressible Gas Flow Law for air: Mass Flow Rate= 0.532×(Driving Pressure in lbf/sqft)×(Opening Area in sqft)/ (square root of initial temperature in degrees Rankine), where lbf is pounds force equal to the gravitational acceleration, 32.2 feet per second squared, times one pound mass (designated lbm).

Despite 4 million collisions and 120,000 deaths last year, the average driver only experiences 3 collisions in his lifetime. He is unlikely to pay more than $300 for a system to reduce his damage in a rare collision. To get under this price target, the air bag of the present invention is only big enough to prevent vehicle occupant death for collisions into immovable objects up to 45 mph and injury and vehicle damage up to 30 mph. Side and rear end collisions with other vehicles of similar weight will produce lower forces and less damage for comparable collision velocities than hitting immovable objects, because the air bag will push these other vehicles and allow a longer deceleration path, time, and hence rate.

For cars, trucks, buses, ambulances, and motorcycles, historically 95% of the collisions occur at less than 45 miles per hour contact velocity. Two thirds of the collisions are with other vehicles. One third are with stationary objects encountered in running off the road. Less than 1% of collisions are with pedestrians including bicyclists.

The mathematical modeling of such an exterior air bag system shows that it should be 5 feet long, 4 feet wide, and 2.5 feet tall and start with an initial inflation pressure of 15 psig. to handle the typical 3,000 pound American car with passengers colliding with an immovable object. A 4,000 pound car would need a proportionately larger contact surface area or compression length to get the same protection from collisions with immovable objects. Most cars are only 4 to 5 feet wide with frontal area of only 6 to 7.5 square feet. The other option to accommodate the heavier cars is higher bag pressure.

The present invention uses two 30 inch diameter cylindrical bags 5 feet long. The two bags are seamed together longitudinally twice so that their width together is only 48 inches to fit the front of smaller cars. The fabric, Style 2205, is the strongest nylon fabric available from Millikin and Company and can carry 600 lbf per inch width at one standard thickness. Using pressure times radius equal to hoop force per inch equal fabric strength, these bags can only hold up to 40 psig. until they burst. Therefore higher initial pressures and larger frontal areas for heavier cars are not practical because they would burst the fabric of the two cylinder design. A three cylinder design would handle the higher pressures and wider fronts, however.

But, a 100,000 pound truck or a 30,000 pound bus would need bags 30 and 10 times as big as those for the 3,000 pound car to survive 45 mph collisions with immovable objects. This size bag would be prohibitively expensive. So, the present invention puts 4 or 5 sewn cylindrical bags across the 8 to 10 foot wide truck or bus front strong enough to handle collisions with vehicles 5,000 pounds and under. This system for trucks and busses will reduce liability claims on collisions with cars accounting for 60% of all truck and bus collisions and 90% of all liability claims.

The compact air bag design of the present invention has the potential to buckle, however. Compressing the air bag from both ends creates forces that could get unstable and cause the mid-length of the bag to hinge upward. The present invention uses two features to prevent the upward hinge. First, a strip of porous fabric on the upper side of the bag creates a vent with an upward jet that causes a downward force on the bag keeping it from hinging upward. Second, the ends of the air bag cylinders extend under the bumpers of the colliding vehicles all the way down to the pavement. These under the bumper parts of the bag ends are not pushed on by either colliding vehicle. The upper half of the cylinder ends are pushed on by the colliding vehicles thereby eccentrically loading the bag cylinders and causing them to buckle downward. Because a downward buckle is supported by the pavement, it is a stable buckle and will allow the cylinders to carry the full load of the collision.

The air bag design of the present invention has the potential to lift up in the wind due to Bernoulli wind forces. The present invention has two features to prevent this lifting. First, a strip of porous fabric longitudinal on the upper side of the bag creates a vent with an upward jet that causes a downward force on the bag keeping it from lifting upward. Second, a backward slant of 10 to 40 degrees on the front end of the bag creates an aerodynamic foil that pushes the bag downward as it moves forward through the air.

The present invention is a collision damage reduction system comprising in various combinations the following components: 1) a quickly inflatable air bag or bags on the exterior of the car, truck, bus, ambulance, or train, 2) an inflator(s) for the air bag(s), 3) a manual switch for the vehicle operator to actuate the inflator(s), 4) a vehicle motive power interrupter, 5) a vehicle brake actuator, 6) pre-inflation covers for the exterior air bags, 7) a controller with a collision imminence detector including radar or sonar of suitable wavelength or a vehicle accelerometer, and the controller can actuate the inflators, horns, headlamps, brakes, vehicle motive power circuits, and cockpit buzzers, beepers, lights, and voice messages.

The air bag remains packed in a small compartment, approximately 1 cubic foot, until it inflates. The bag can have single or multiple interior compartments and inflators. The inflators can be any air bag inflator technology appropriately sized. However, the preferred embodiment uses a new inflator designed by Global Manufacturing Solutions, Inc., Miamisburg, Ohio disclosed under their patent filing.

The air bag inflators, horn blower, headlamp lighter, accelerator interrupter, brake actuator, and steering actuator can be activated by several systems. One is an operator manual switch. Another is a collision warning radar or sonar system and controller that automatically anticipates a collision and activates any of the above components. Such optical and electromagnetic radars and controllers have been shown publicly by Eaton-Vorad, Cleveland, Ohio and Temic, Stuttgart, Germany. These radar and sonar systems can use any suitable wavelength of electromagnetic or acoustic radiation. Some suitable wavelengths for electromagnetic radiation include visible and infrared light for optical waves, K-band and X-band for radar e.g. 33 megahertz, and ultrasound e.g. above 20 kilohertz for acoustic waves. An accelerometer could sense sustained intense braking and actuate any combination of the above components.

OBJECTS AND ADVANTAGES

The present invention has several advantages over the prior art.

a) The present invention prevents death of occupants of vehicles under 5,000 pounds, for initial collision velocities below 45 miles per hour, which account for 95% of automobile collisions.

b) The present invention prevents damage to vehicles under 5,000 pounds with initial collision velocities under 30 mph.

c) The present invention protects collidants taller than 1.5 feet and less than 5,000 pounds.
d) The present invention takes up very little space, approximately 1 cubic foot, before deployment for collisions. Therefore, during normal driving, the present invention causes little wind resistance or added fuel requirements therefrom. Its small size also allows the designer flexibility in aesthetic choices. Likewise, its small size does not interfere with parking spaces or lane sizes.
e) The present invention weighs very little, about 20 pounds. Therefore, it requires little extra support structure and consequent costs. Its low weight also requires little extra fuel for its acceleration as part of normal vehicle travel.
f) The present invention becomes fully inflated within 200 milliseconds of activation.
g) The present invention is inexpensive, about $300 for cars and $750 for trains, trucks, buses, and ambulances. It has an average payback period of less than 3 months for ambulances and urban delivery trucks.

BRIEF DESCRIPTION OF THE SEVERAL VIEWS OF THE DRAWINGS

Reference Numerals in the Drawings

1. Truck.
2. Car.
10. inflator.
20. Retracted air bag.
23. Inflated air bag.
25. Porous fabric strips.
26. blow-out patch.
30. Exterior air bag cover.
31. latch for exterior air bag cover.
32. Flexible upper edge.
33. Vehicle.
34. Hinge.
35. cover.
50. radar or sonar.
60. Accelerometer.
70. horn.
80. High beam head lights.
90. controller.
100. Vehicle motive power interrupter.
110. Vehicle brakes actuator.
130. warning lights, beepers, buzzers, and voice message module.
140. Manual switch.
223. Exterior air bags.
224. Slant.

DETAILED DESCRIPTION OF THE INVENTION

Figure 1:
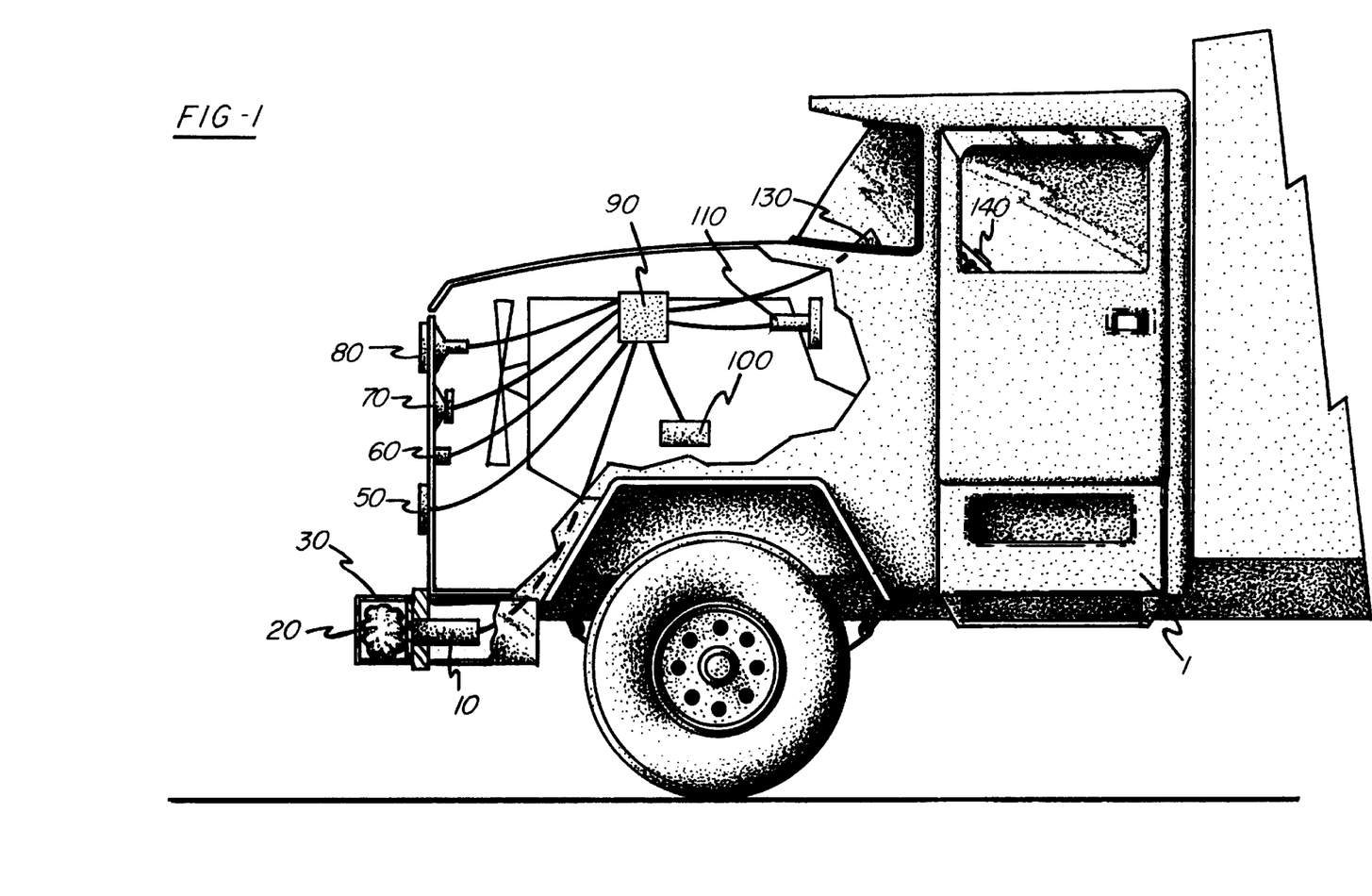
FIG. 1 shows a side view of a truck, bus, or ambulance with the bumper bag deflated and packed. The fender is cut away to show all the components of the system.
Figure 2:
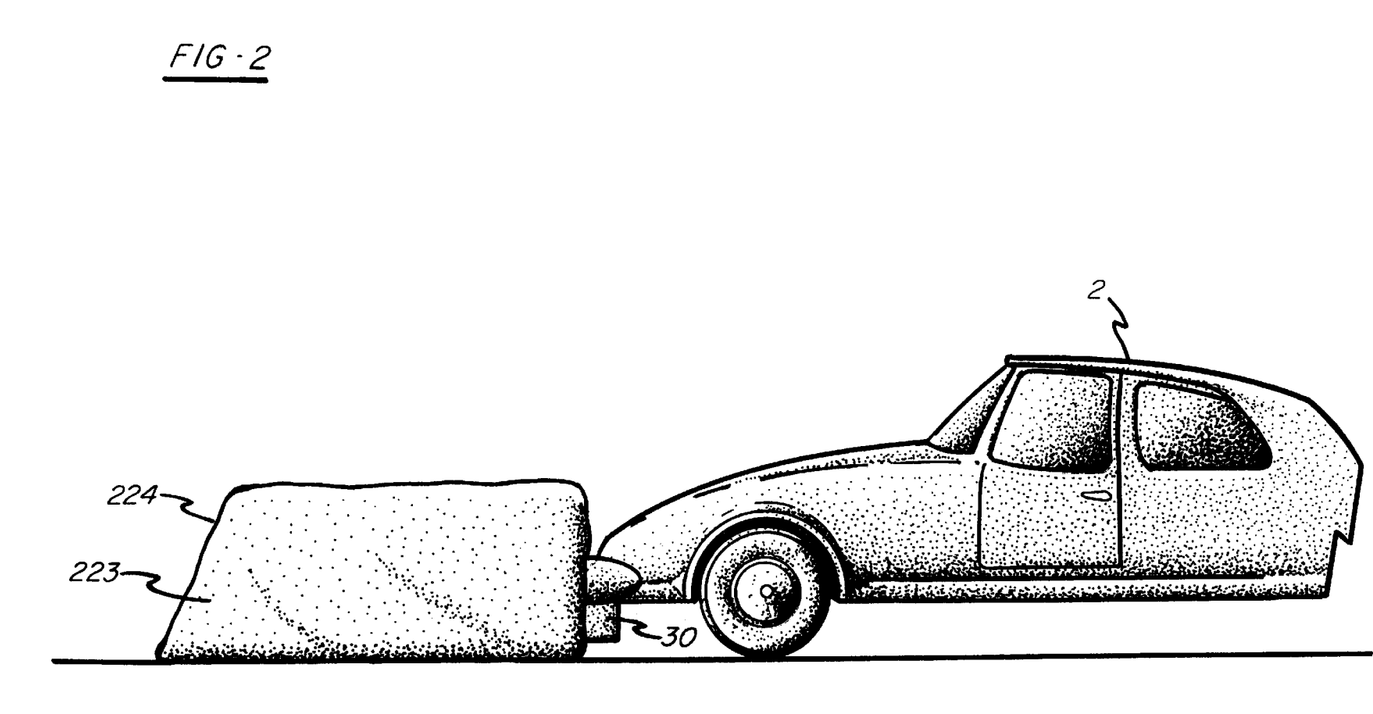
FIG. 2 shows a side view of the truck cab with the bumper bag inflated and engaging the rear end of a car.
Figure 3:
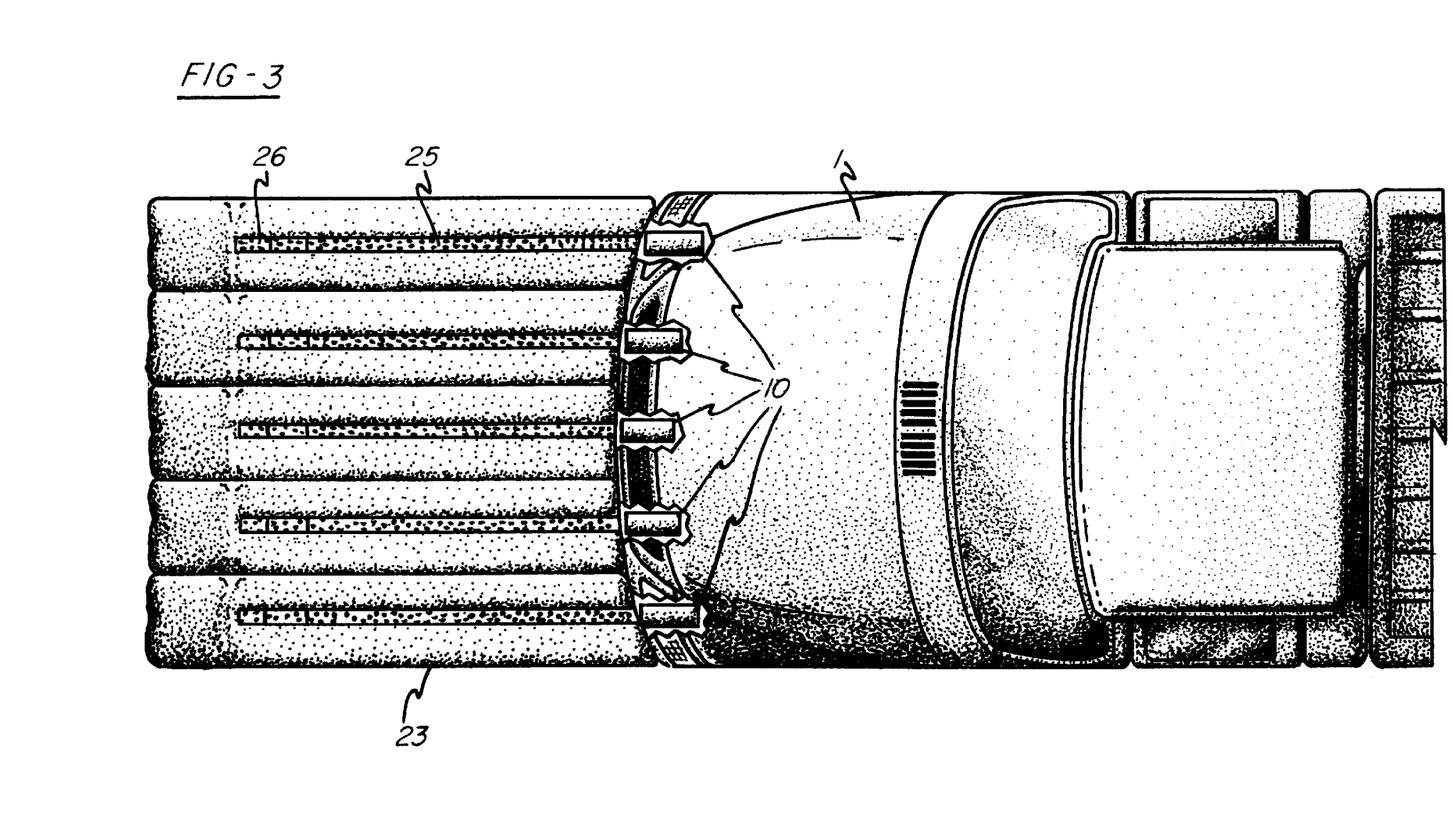
FIG. 3 shows a top view of a truck cab with the air bag inflated. Cutaways show four inflators, one for each air bag.
Figure 5:
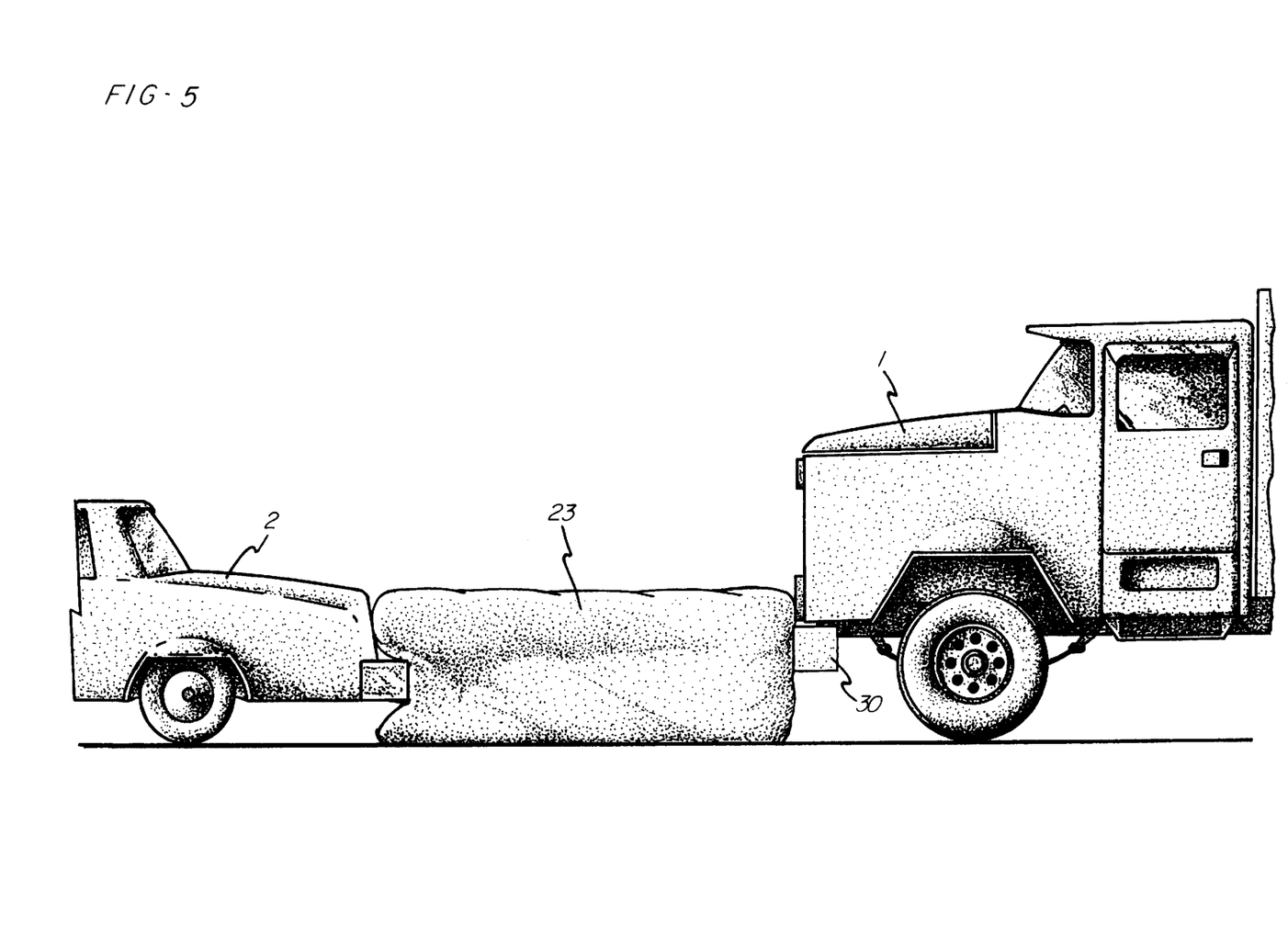
FIG. 5 shows a side view of an automobile with a bumper bag inflated.

A typical embodiment of the collision damage reduction system of the present invention is illustrated in FIG. 1 (side view bag uninflated), FIG. 2 (side view bag inflated), and FIG. 3 (top view bag inflated). These first three figures show the system in full detail mounted on a truck 1 bus, or ambulance. These same details apply to all the other vehicles that could use the system including the car 2 depicted in FIG. 5 though not shown in full detail.

For the automatic option, the manual switch 140 is connected by wire or fiber optic cable to the system controller 90. System controller 90, supplied by Eaton-Vorad of Cleveland, Ohio or Temic of Stuttgart, Germany, is connected by wire or fiber optic cable to the high beam head lights 80, the horn 70, the vehicle motive power interrupter 100, the vehicle brakes actuator 110, and the inflators 10, supplied by Global Manufacturing Solutions, Miamisburg, Ohio. Additional connections to the controller by wire or fiber optic cable are sonar or radar 50, and warning lights, buzzer, beeper, and-or voice message module 130, also supplied by Eaton-Vorad or Temic. The system controller has additional sonar or radar processing and analysis code. The automatic version also has an optional accelerometer 60 wired to the controller. The accelerometer 60 signals can be used to actuate the retracted air bag 20.

For the manual option (not shown), the manual switch 140 will close the electrical circuit to the inflator igniter and the brake actuator solenoid and open the circuit to the vehicle motive power interruptor 100 i.e. engine ignition or electric motor starter.

The air bag 23 is made of silicone coated nylon fabric, Style 2205 made by Millikin and Company, LaGrange, Ga. The porous fabric strip 25 is made of uncoated nylon fabric, Style 2199 also made by Millikin. nylon fabric, Style 2199 also made by Millikin. All the stitching is done with nylon thread, #207 from Atlantic Thread Company, Baltimore, Md. Each thread can hold 26 to 32 pounds of force. The stitching of prototype air bags was done by Morning Pride Manufacturing of Dayton, Ohio. The longitudinal stitches were done on a conventional jean pant leg machine. This machine automatically folds the fabric such that each thread penetrates four layers of fabric. The resulting folded seam is about a half inch wide with two stitches down either side. This seam under pull tests was not as strong as the base fabric. After several sample seams were pull tested, the double seam with two additional threads stitched on the inboard edge of the double seam proved strong enough to equal the base fabric strength.

The air bag end fabric circles (caps) were sewn onto the sleeves by aligning the circle edges with the longitudinal tube end edges. The two fabric edges were folded over together to form a cuff on the tube. Two of #207 threads were sewn through all four layers of the cuff to form an adequately strong end cap seam.

The end cap attached to the inflator had a double layer of fabric, Style 2205, to handle the extra stresses of over-pressurization on initial inflation and potential fabric tearing or burning. The inflator end of the fabric tube was cuffed over six inches to provide extra hoop strength during initial over-pressurization, too.

The bag connection to the inflator was done with a conventional 4 inch diameter opening metal flange for a steering wheel air bag. The fabric was reinforced with two extra layers of Style 2199 fabric. A ring of seams was sewn inside the ring of bolt holes and outside the ring as well such that the stitch penetrated four layers of fabric. A soldering iron was used to melt bolt holes in the four layers of fabric.

Figure 4:
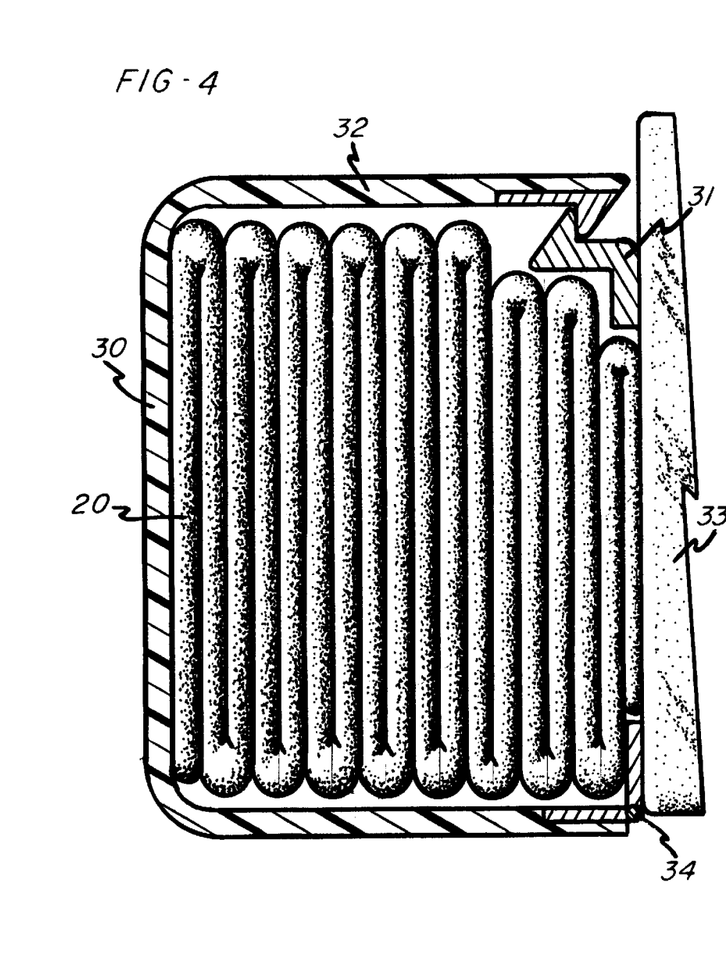
FIG. 4 shows a cover for the air bags for both exterior mounted and recess mounted exterior air bags.

The cosmetic cover 30 & 35 for the retracted air bag 20 comes in two forms—exterior mounted and recess mounted on module 33 as shown in FIG. 4. Both options are available for all vehicles. High speed and stylish vehicles probably will require recess mounting for aerodynamic and styling purposes. Others, particularly retrofits, may be satisfied with exterior mounting for cost reasons.

The cover 30 & 35 for the retracted air bag 20 comes in two forms - exterior mounted and recess mounted as shown in FIG. 4. Both options are available for all vehicles. High speed and stylish vehicles probably will require recess mounting for aerodynamic and styling purposes. Others, particularly retrofits, may be satisfied with exterior mounting for cost reasons.

The collision damage reduction system of the present invention shown in FIG. 1, operates either manually or automatically. Under manual operation, the driver perceives an imminent collision and presses the manual switch 140 shown on the steering wheel, just a thumb stroke from the hand grips. When the manual switch is pressed, the inflator(s) 10 ignites, the motive power interrupter 100 shuts off the engine or motor, and the brake actuator 110 actuates full braking. The retracted air bag 20 begins to inflate, putting pressure on the upper edge 32 of the cover 30 or 35. The upper edge 32 lifts up and disengages the latch 31. The retracted air bag 20 pressure then pushes the cover 30 or 35 forward pivoting about hinge 34. As the cover rotates, it flips out of the way of the advancing air bag.

Within 200 milliseconds, the entire exterior air bags of all types ate fully inflated and ready to engage an oncoming object. The present invention includes versions that inflate slower or faster than 200 milliseconds, too. The filling speed is determined by the burn rate of the propellant and the size of the discharge orifice of the inflator.

The exterior air bag inflates to a relatively low pressure, about 15 psig. The slant 224 on the windward side of the inflated air bag 23 engages the air stream and pushes or steers the bag down onto the pavement. The gas jets from the porous fabric strip 25 also push or steer the air bag down onto the pavement. The inflated air bag 23 or 223 then hits the collidant. If the collidant is another vehicle, the upper faction of both ends of the inflated air bag 23 or 223 take the collision load. This eccentric load causes the bags to buckle, hinging downward against the pavement Thus the shape of the inflated air bag 23 or 223 steers or pushes itself downward by causing a downward buckle when contacting a solid object. If the collidant is a tree or a wall, the eccentric load will come from the vehicle end only, and the downward buckle will not be as forceful.

As the inflated air bag 23 or 223 puts force on the vehicle and collidant, the collision velocity begins to slow. As the inflated bag 23 or 223 is compressed, the gas pressure inside rises thereby increasing the slowdown force on the vehicle and collidant. As the slowdown rate approaches a deceleration of 18 g's, a pressure relief valve opens in the form of a blow-out patch 26 in the porous fabric strip 25.

When the vehicle stops, the driver gets out of the vehicle to inspect his vehicle and collidant. When the driver stuffs the exterior air bag back in its compartment, he flips up the cover and snaps it into place. When he returns home, he takes the vehicle into the dealer for service on the inflators and air bag with appropriate replacement and recycling to the manufacturer.

On collision damage reduction systems with the automatic option, sonars or radars 50 of any suitable wavelength including optical wavelengths will detect advancing objects. The system controller 90 will take this signal, analyze it, and predict collisions. If a collision seems imminent, the system controller 90 will first warn the driver with warning lights, buzzers, beepers, and-or voice messages 130 at various time intervals before collision. The system controller will also back off the accelerator when collisions seem imminent in say 3 seconds. At say 2 seconds to collision, the system controller 90 will turn on the brakes actuator 110, high beam head lights 80, and horn 70. At say one second to collision, the system controller 90 inflates the exterior air bag.

Also part of the automatic system, an accelerometer 60 may indicate imminent collision. The accelerometer signal resulting from sustained severe braking would be the most likely indication of imminent collision. The controller would read the signal and respond as if the manual switch 140 were pressed.

SUMMARY, RAMIFICATIONS, AND SCOPE

Accordingly, the reader will see that the present invention has several advantages over the prior art.

a) The present invention prevents death of occupants of vehicles under 5,000 pounds, for initial collision velocities below 45 miles per hour, which account for 95% of automobile collisions.

b) The present invention prevents damage to vehicles under 5,000 pounds with initial collision velocities under 30 mph.

c) The present invention protects collidants taller than 1.5 feet and less than 5,000 pounds.

d) The present invention takes up very little space, about 1 cubic foot, except during collisions when it inflates to a huge size, about 50 cubic feet. Therefore, during normal driving, my invention causes little wind resistance or added fuel requirements therefrom. Its small size also allows the designer flexibility in aesthetic choices. Likewise, its small size does not interfere with parking spaces or lane sizes.

e) The present invention weighs very little, about 20 pounds. Therefore, it requires little extra support structure and consequent costs. Its low weight also requires little extra fuel for its transportation.

f) The present invention becomes fully inflated within about 200 milliseconds of activation.

i) The manual version of the present invention is inexpensive (about $300 for cars and $750 for trucks).

Although the description above contains many specificities, these should not be construed as limiting the scope of the invention but as merely providing illustrations of some of the presently preferred embodiments of this invention. For example the exterior air bag can have different shapes, different inflators, different fabrics or materials or colors, and different hole sizes and patterns. For instance the exterior air bag could be mounted on the side of the vehicle and manually or automatically inflated.

Thus the scope of the invention should be determined by the claims and their legal equivalents, rather than by the examples given.

What is claimed is:

1. A method for minimizing damage and injury to a vehicle, to occupants of said vehicle, and to collidants of said vehicle, during a collision comprising the steps of:
   a. detecting the imminence of a collision by radar or driver's sight,
   b. inflating long air bags on an exterior surface of said vehicle before contacting said collidants,
   c. keeping a portion of said air bags on the ground before and after contacting said collidant, and
   d. compressing said air bags between said vehicle and said collidant to reduce the velocity of said collision, whereby reducing velocities of said collision of said vehicle and said collidant will reduce damage and injury to said vehicle, said collidant, and said occupants.

2. The method of claim 1, further including the step of actuating brakes of said vehicle in response to said detecting step.

3. The method of claim 1, further including the step of interrupting a motive power circuit to said vehicle in response to said detecting step.

4. The method of claim 1, further including the step of releasing air from said air bag at a controlled rate following contact with said collidants.

5. A collision damage reduction system for a vehicle comprising:

a. air bags and inflators adapted to inflate outside said vehicle, b. a slant on a portion of the front face of said air bags to deflect oncoming air upward and thereby provide a thrust force to keep a portion of said air bags on the ground after inflation but before said air bags contact a collidant, and c. a manual switch in the driver's compartment to actuate said inflators before a collision, said manual switch actuated by an occupant of said vehicle, whereby the inflated air bags will compress between said vehicle and the collidant and reduce the velocity of said collision and thereby reduce damage and injury.

6. The collision damage reduction system of claim 5, wherein said manual switch includes means for automatically actuating the brakes of said vehicle prior to said collision.

7. The collision damage reduction system of claim 5, wherein said manual switch includes means to automatically interrupt motive power circuit to said vehicle prior to said collision.

8. The collision damage reduction system of claim 5, further including a radar or sonar using any suitable wavelength of electromagnetic or sonic radiation to detect imminent collisions and a controller for actuating said inflators on said vehicle.

9. The collision damage reduction system of claim 5, wherein said air bags are made of coated fabric.

10. The collision damage reduction system of claim 5 wherein said air bags include a means of venting one side of said air bags to provide steering of said air bags.

11. The collision damage reduction system of claim 5 wherein said air bags have a cuff on their inflator end to provide extra hoop strength.

12. The collision damage reduction system of claim 5 wherein the vehicle or collidant contact ends of said air bags have more surface area below than above the respective vehicle or collidant body that the ends contact so as to ensure eccentric loading and downward hinging or buckling of the long axis of said air bags after compression begins.

13. The collision damage reduction system of claim 5 wherein said air bags have a slant on a portion of their front face to scoop or lift lightweight collidants predominantly upward.

14. The collision damage reduction system of claim 5 further comprising multiple exterior air bags disposed about exterior surfaces of said vehicle.

15. The collision damage reduction system of claim 5, further including an enclosure for mounting said air bags flush with a surface of said vehicle.

16. The collision damage reduction system of claim 5, further including an enclosure for mounting said air bags to an exterior surface of said vehicle.

17. The enclosure of claim 15 or claim 16, further including a latch adapted to be lifted and unlatched by a gas pressure in said air bags.

18. A long exterior air bag system for collision cost reduction for a vehicle comprising:

a. substantially cylindrical air bags with substantially flat ends with major axes longer than two feet and substantially normal to an exterior surface of said vehicle b. inflators adapted to inflate said air bags outside said vehicle, c. a slant on a portion of the front face of said air bags to deflect oncoming air upward and thereby provide a thrust force to keep said air bags on the ground after inflation but before said air bags contact a collidant, and d. a switch to initiate inflation of said air bags before a collision, whereby the inflated air bags will compress between said vehicle and the collidant and thereby reduce damage and injury.

19. The collision damage reduction system of claim 5 wherein said air bags have a double layer of fabric in their end caps attached to the inflators to provide extra strength during initial inflation over-pressurization and to prevent fabric tearing or burning.

20. The collision damage reduction system of claim 5 wherein said air bags are seamed longitudinally along their major axis with the fabric folded to make a double layer of each fabric through which at least four threads are sewn to provide hoop strength.

* * * * *